INVENTOR.
SATORU TSUKAGAWA
ATTORNEY.

United States Patent Office 3,253,583
Patented May 31, 1966

3,253,583
ROTARY INTERNAL COMBUSTION ENGINE
Satoru Tsukagawa, Tokyo, Japan, assignor to Isuzu Motors Ltd., Tokyo, Japan
Filed Apr. 22, 1963, Ser. No. 274,490
Claims priority, application Japan, Apr. 24, 1962, 37/16,569
6 Claims. (Cl. 123—8)

The object of this invention consists in obtaining a rotary internal combustion engine wherein an internal rotor is provided whose cross section is defined by a two-leaf epitrochoid or its parallel curve and there is also provided an external rotor rolling at a gear ratio of 3 to 2 relative to the internal rotor while the former is kept in constant contact with the external surface of the latter at three edges so that a rotary pump mechanism can be constituted permitting various changes in volume between said external and internal rotors and in this case a fresh gas suction port and an exhaust outlet are opened at the external surface of one of the two leaves of the epitrochoid or its parallel curve of the internal rotor and a combustion chamber of selected shape and at least one opening for ignition plug or fuel-injection nozzle of conventional type are comparatively freely provided between the edges of the external rotors, thus constituting a four-stroke cycle internal combustion engine enabling a very high compression ratio to be obtained.

Therefore, the present invention relates to an internal combustion engine characterized by the fact that the cross section of an internal rotor is defined by a two-leaf epitrochoid or its parallel curve and an external rotor is so provided as to roll at a gear ratio of 3 to 2 relative to the internal rotor while the former is kept in constant contact with said external surface of the latter at three edges in parallel with its rotating shaft so that a rotary-type pump mechanism can be constituted permitting the occurrence of changes in volume between said external and internal rotors and in this case a fresh gas suction port and an exhaust outlet are freely opened at the external surface of one of the two-epitrochoidal leaves, that is, one half side of the internal rotor, said half being regarded as one of the two symmetrical halves divided by the minor diameter of the two-leaf epitrochoid, and there is provided a combustion chamber of a selected shape between the edges of the external rotor so as to constitute a four-stroke cycle internal combustion engine, and at least one ignition plug or fuel-injection nozzle of conventional type, is freely opened between the respective edges of said external rotor.

With reference to the accompanying drawings, the invention will be explained in detail.

FIG. 1(a–l) is an explanatory view to shown the operation of an internal combustion engine and the arrangement of a suction port and an exhaust port, according to the present invention. FIGS. 2 and 3 are structural views of an internal combustion engine according to the present invention. Namely, FIG. 2 is a view in vertical section taken along the line I—I and FIG. 3 is another view taken along the line II—II of FIG. 2.

In FIG. 1(a), numeral 1 is an external rotor, 2 an internal rotor whose cross section is defined by a two-leaf epitrochoid, or its parallel curve and 3, gas seals enclosed in the edges of the external rotor. The internal shape of this external rotor 1 is selected so that said external rotor should not interfere with the internal rotor between the gas seals. Numeral 4 is the pitch circle of an inner-toothed gear integral with the external rotor, and 5 the pitch circle of an outer-toothed gear integral with the internal rotor to mesh with each other.

The gear ratio of the above mentioned gears 4 and 5 is 3 to 2.

Numeral 6 is a suction port disposed in the internal rotor and 7 an exhaust port.

With reference to FIGS. 1(a) to (l), the operation of the present engine will be explained. Both the external and internal rotors are understood to rotate in the direction of an arrow shown in the drawing, i.e. clockwise. Then, the space chamber A will be explained. The operational views of (a) to (l) show the position at periods of 90° rotation of the internal rotor and 60° rotation of the external rotor. In FIG. 1(a), the space chamber A is positioned in place for combustion. The volume of the space chamber A expands up to (b), (c) and then the exhaust port 7 opens at (d).

Subsequently, exhausting operation takes place at (e), (f) and both the suction and exhaust ports open at a time, as shown by (g) in the drawing, thus providing a so-called overlapped period. The intake of fresh gas takes place at (h) and (i) and reaches the maximum at (j) so that the gas port closes. The compression of the air takes place at (k) and (l) and the step of combustion returns at (a). This series of operations goes on in the same process common to each space between the three edges. Insofar as the gear ratio of the external rotor and the internal one is kept 3:2, the above mentioned operation goes on, regardless of the absolute speed of rotation of either rotor.

Next, with reference to FIGS. 2 and 3, one embodiment of the construction of an internal combustion engine, according to the present invention, will be explained in detail by referring to a gasoline engine of such type that both the external rotor and the internal one rotate in the same direction around respectively fixed centers of rotation.

Figure 1:
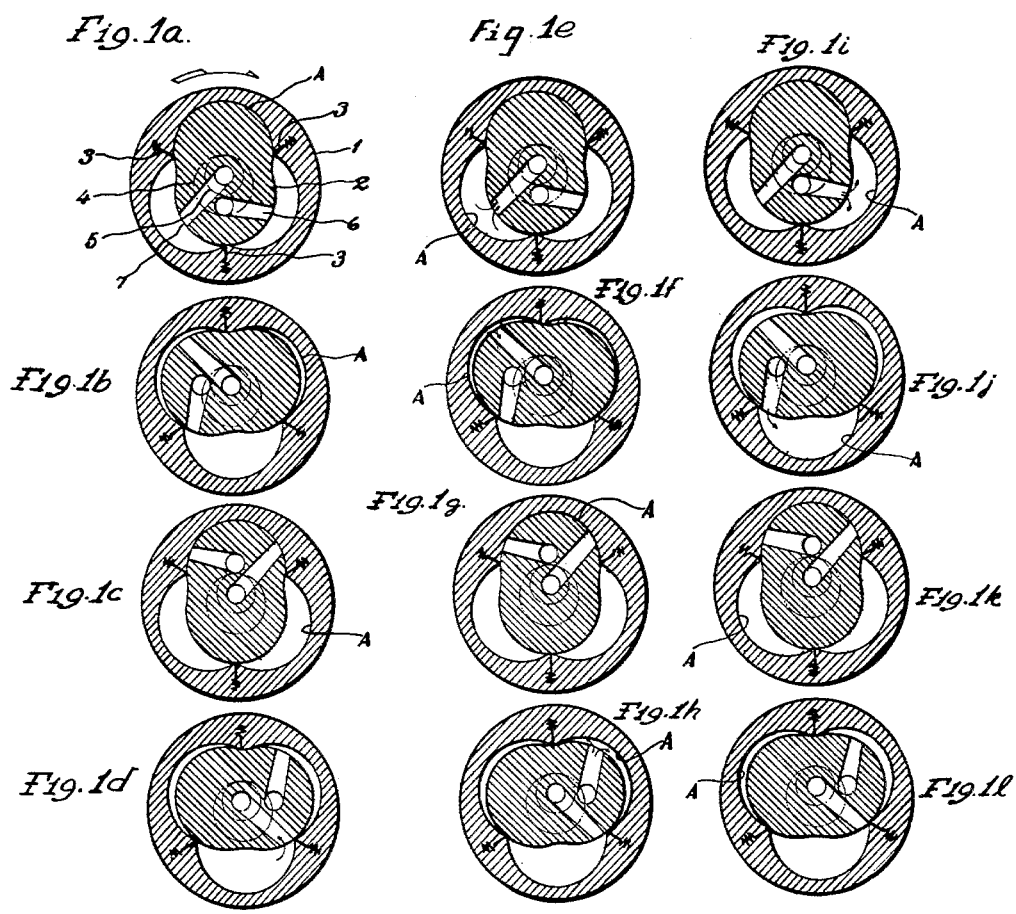

Numeral 1 is an internal rotor whose cross section is defined by a two-leaf epitrochoid or its parallel curve. 2 and 3 are rotating shafts integral with the internal rotor and they are supported by bearings 6 and 7 placed in casings 4 and 5 respectively. Numerals 8, 9 and 10 are three elements constituting the external rotor and are fastened together by means of bolts 11. There are bearings 12 and 13 disposed between lateral elements 9 and 10 of the external rotor and the casings 4 and 5, thus supporting the external rotors 8, 9 and 10. There are also provided gas seals 14 at three edges of the inner surface of a central element 8 of the external rotor. These gas seals 14 are pressed against the outer surface of the internal rotor 1 by means of a spring to resist centrifugal force. There are also provided gas seals 16 at lateral elements 9 and 10 of the external rotor to keep the lateral surface of the rotor gas-tight.

It is possible to press the gas seals 16 against the internal rotor by means of any kind of spring. Numeral 18 is an outer-toothed gear disposed on the shaft 3 and 19 an inner-toothed gear disposed on the lateral element 9 of the external rotor. The gear ratio of these outer-toothed and inner-toothed gears is 2 to 3, meshing with each other to define the phase of the external rotors 8, 9 and 10 against internal rotor 1. In running this engine, a fuel mixure of gasoline and lubricating oil is used and the air-fuel mixture is sucked into the engine through the suction port 20, the meshing space 21 of the phase gears and the suction port 22 of the internal rotor. In this case the fuel mixture helps lubricate the bearings 6, 12, the phase gears 18, 19, the gas seals 14, 16 and the sliding surface of the internal rotor.

FIG. 1(h), (i) and (j) are self-explanatory to assure the possibility of a construction of utilizing the meshing space 21 of the phase gears as part of the suction port and simultaneously to lubricate the gears effectively.

In FIG. 1(h) illustrating the opening time of the suction port, the lateral opening portion of suction port of the internal rotor starts to open at the meshing space of the phase gears and after the maximal opening condition shown by FIG. 1(i) it reaches the closed condition shown by FIG. 1(j). This relationship can be satisfied with reference to each of the three working spaces. The exhaust gas is discharged through the exhaust port 23 disposed at the inner portion of the shaft 3 and the internal rotor. The end of the shaft 3 is covered by a cover 24 part of which forms the suction port 20 and the exhaust port 25 and the exhaust gas is forwarded to an exhaust pipe through the exhaust port 25.

It is also possible to utilize the wall between the suction port 20 and the exhaust port 25 for heating the air-fuel mixture.

The engine can be cooled in the following manner.

Namely, the external rotor is air-cooled by means of a cooling fin disposed at the outer surface of the same. Cooled air is sucked into the casings 4, 5 from a suction inlet 26 provided at a suitable portion of the same by the fan action of the cooling fin and discharged from an air-outlet 27. The internal rotor is cooled by means of any cooling liquid. In the present case, lubricating oil is used. It is supplied from an oil feed joint 28 into a cooling jacket 30 provided at the inner portion of the internal rotor through the annular passage surrounded by oil seals 29. Numeral 31 is a labyrinth seal to protect the oil seals from exhaust gas. The cooling liquid is discharged through a passage 32 and out of the engine from an outlet 33. A passage 34 is provided for the purpose of lubricating a bearing 7 and passages 35 and 36 are utilized for the lubrication of a bearing 13. Likewise, it is possible to provide lubricating passages 37 and 38 also for bearings 6, 12. Numeral 39 is an oil seal to deal with the end of a shaft 2 and 40 and 41 are respective oil seals for bearings 12 and 13. While the exhaust port 23 is cooled with a cooling liquid at its outer surface, as aforesaid, it is possible to have the exhaust port 23 composed by more than two laminated sheets so that heating load of the cooling liquid can be lessened and in such a case, the inner laminated sheet will receive a larger degree of expansion than the outer one and therefore, it is necessary to give the inner laminated sheet such a construction that its expansion may not be restricted. Numeral 43 is an ignition plug of common use which is open to combustion chamber 44. Although it is possible to select a comparatively wide range of shapes and locations for the combustion chamber, a little triangular or similar so-called wedge-type combustion chamber is selected in the present case and it is located in the direction of rotation of the rotors against the middle of two adjacent edges of the external rotor. By this arrangement, it is made possible to dispose the plug 43 at an angle of approx. 90° to the radius of the rotor so as to reduce the external diameter of the engine and at the same time, to obtain a swirl of gas by utilizing the pushing effect of the gas of the compression space between the rotors at the other half of the position of the combustion chamber and moreover to conduct said flow towards the ignition plug. Other advantages incidental to the position of the combustion chamber are that the exhaust port can keep opening in a large area in the combustion chamber at the end of exhaust stroke so that the exhausting operation can be carried out by inertia and at the same time the suction port can remain open at the clearance space between the rotors to prevent backfire during the overlapped period of the suction and exhaust ports. Subsequently, the electrical system of the ignition apparatus plug will be explained. Numeral 45 is a circuit breaker for ignition current, 46 a cam to operate the breaker 45 provided at the outer circumference of a power output coupling fixed to the shaft of the internal rotor, 47 a terminal for electric distribution of ignition current, 48 an electric receiving terminal provided on the external rotor 10 corresponding to each plug and moreover, electricity is connected to a plug from terminal 48 by means of an electric wire which is cut away in part as shown in the drawing.

The adjustment of ignition timing can be achieved by adjusting the relative position of cam 46 and breaker 45. According to FIG. 1, the reason is self-explanatory why the breaker is opened or closed by means of rotation of the shaft and the distributor of ignition current is constructed by a part of the casing 5 and the external rotor 10.

In view of the upper position of the vertical axis of FIG. 1(a) to (l) (such axis is not shown in the drawings) as a position prepared for ignition (abbreviated as PPI referred to hereinafter), the space of compression of the internal rotor 2 and the external one 1 of the drawings (a), (e) and (i) resides in each position of combustion and such position shifting from (a) to (e), from (e) to (i) and from (i) to (a) respectively can be obtained during one rotation of the internal rotor and therefore, the breaker 45 in FIG. 2 can be opened accurately by means of one rotation of the internal rotor. Consequently, at least one plug is provided per each space so that electricity is connected to the above mentioned plugs through the distributor terminals 47 and 48 shown in FIG. 2 thereby enabling usual ignition to become effective.

Figure 2:
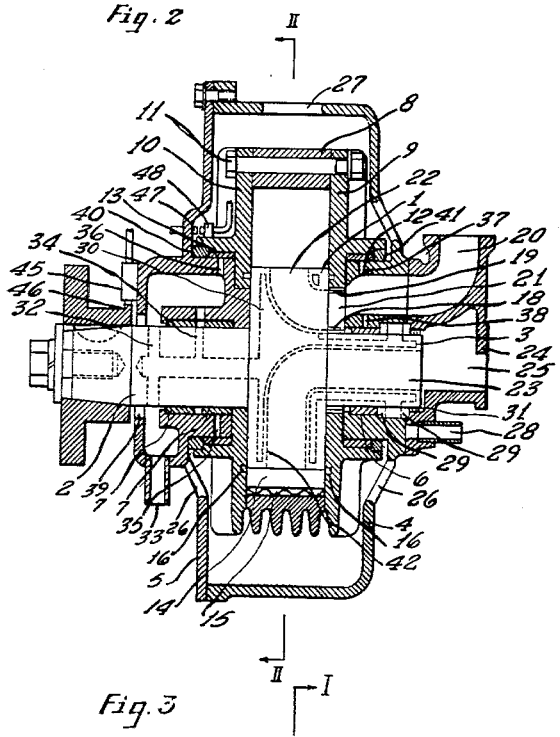
FIG. 2 is a view in section taken along the line I—I of FIG. 3.
Figure 3:
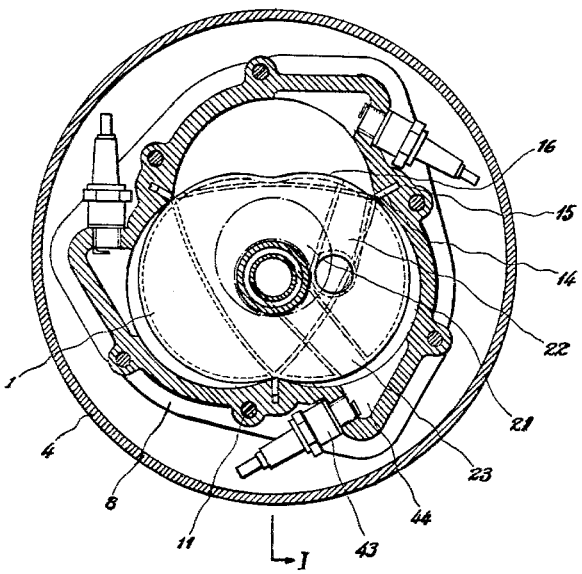
FIG. 3 is another view taken along the line II—II of FIG. 2.

Corresponding to such arrangement, the closed space between the internal rotor 2 and the external one 1 is located at the above-mentioned PPI position at an intermediate point (c) between (a) and (e), another point (g) between (e) and (i) and also another point (k) between (i) and (a) as shown in FIG. 1. Then the electric terminals 47 and 48 of the distributor come to a position where the distribution of electricity is prepared but since the closed space is in position of the overlapped period of the suction and exhaust ports, there is no necessity of flow of ignition current, and excessive waste of electrodes of the plug would result, if ignition current is caused to flow at that time. Therefore, the circuit breaker must be necessarily operated with reference to the arch profile of the external rotor located in the aforesaid PPI position, i.e. with reference to every second arch profile which comes in the position of combustion. However, it is evident that such effect can be fulfilled by the operation of a breaker for ignition current only when the internal rotor 2 comes just in the position of combustion for the closed space corresponding to it.

The characteristics of an internal combustion engine according to the present invention are understood as follows.

(1) It is possible to advantageously provide a combustion chamber of optional shape between the respective edges of the external rotor and a plug or fuel-injection nozzle can be opened freely for the combustion chamber and heating load and waste lessened by means of provision of at least one ignition plug or fuel-injection nozzle in each combustion chamber, for example, a plug or fuel-injection nozzle of conventional type is available for practical use without the necessity of any such special device on said element as is often the case with a known engine of N.S.U.-Wankel type.

(2) The minimal volume of closed space between the external rotor and the internal one, i.e., the so-called clearance volume can be held extremely small in the case of an internal combustion engine of this type. Accordingly, it is made easy to obtain a considerably high compression ratio and to utilize sucked-in gas effectively and enhance combustion efficiency by keeping the clearance volume at the level of a minimum.

(3) In the case of an internal combustion engine of such type as an external rotor and an internal one rotate in the same direction around respectively fixed centers of rotation, it is made easy to cool the external rotor of itself by air cooling but since the external rotor rotates at a speed, two-thirds slower than the internal rotor, it is possible to prevent its deformation due to centrifugal force and also to keep low the circumferential speed of the bearings to support the external rotor.

What is claimed is:

1. An internal combustion engine comprising an internal rotor of the shape of a two leaf epitrochoid, an external rotor having a three leaf shaped space to receive the leafs of the internal rotor, bearing means mounting the internal rotor for rotation in the external rotor, bearing means mounting the external rotor for rotation in a fixed frame, gear means connecting the rotors for rotation in the ratio of 3:2, and inlet and exhaust passages in one leaf of the internal rotor located on opposite sides of a radial line drawn from the axis of rotation through the radially outermost dimension of the leaf, said gear means comprising an internal gear on the external rotor and an external gear on the internal rotor and further including an inlet passage in the frame, both inlet passages opening into the space between the gears in timed relation whereby to form a continuous inlet passage from the exterior of the frame to a chamber formed between the internal and external rotors.

2. A device as in claim 1 wherein the means for mounting the internal rotor for rotation comprises shafts fixed to the rotor, a passage in one of the shafts connected to the exhaust passage in the leaf, and a passage in the frame connected to the passage in the shaft whereby to provide a continuous exhaust passage from the exterior of the frame to a chamber formed between the internal and external rotors.

3. A device as in claim 2 wherein the chamber further includes a wedge shaped portion, an ignition plug having spark forming elements in said chamber secured to the external rotor with the axis thereof normal to a radius drawn through the axis of rotation of the external rotor.

4. A device as in claim 2 further including cooling fins on the outer rotor and inlet and outlet openings in the frame whereby rotation of the outer rotor pumps cooling air through the frame to cool said rotor.

5. A device as in claim 2 further including conduit means in said rotor and shafts and means for passing cooling fluid through said conduit means.

6. A device as in claim 5 including further conduit means connected to said first mentioned conduit means for conducting fluid to the bearing means for the cooling and lubricating thereof.

References Cited by the Examiner

UNITED STATES PATENTS

| | | | |
|---|---|---|---|
| 211,582 | 1/1879 | Nash | 103—126 |
| 1,306,699 | 6/1919 | Johanson | 123—8 |
| 1,905,847 | 4/1933 | Galyean | 123—8 |
| 2,050,603 | 8/1936 | Gardner | 123—8 |
| 2,062,576 | 12/1936 | Johnson | 123—8 |
| 2,907,307 | 10/1959 | Striegl | 123—8 |
| 2,988,065 | 6/1961 | Wankel et al. | 123—8 |
| 3,102,683 | 9/1963 | Paschke et al. | 123—8 |
| 3,115,871 | 12/1963 | Luck | 123—8 |

FOREIGN PATENTS

| | | |
|---|---|---|
| 1,285,447 | 1/1962 | France. |
| 156,127 | 11/1904 | Germany. |
| 830,439 | 2/1952 | Germany. |
| 24,559 | 1908 | Great Britain. |
| 61,871 | 8/1923 | Sweden. |

SAMUEL LEVINE, *Primary Examiner.*

JOSEPH H. BRANSON, JR., *Examiner.*

F. T. SADLER, *Assistant Examiner.*